(12) United States Patent
Ni et al.

(10) Patent No.: US 7,543,384 B2
(45) Date of Patent: Jun. 9, 2009

(54) METHOD OF MAKING A VARIABLE THICKNESS MEMBER FOR A VEHICLE

(75) Inventors: Chi-Mou Ni, Washington, MI (US); Steven K. Mackenzie, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 379 days.

(21) Appl. No.: 11/201,458

(22) Filed: Aug. 11, 2005

(65) Prior Publication Data
US 2007/0035118 A1 Feb. 15, 2007

(51) Int. Cl.
*B21D 53/88* (2006.01)
*B21D 21/03* (2006.01)

(52) U.S. Cl. .................... 29/897.2; 29/421.1; 280/800

(58) Field of Classification Search ............. 29/897.2, 29/421.1; 280/781, 789, 797, 798, 800
See application file for complete search history.

(56) References Cited

U.S. PATENT DOCUMENTS

| 2,085,829 | A | * | 7/1937 | Rogers ............... 29/897.35 |
| 3,088,749 | A | * | 5/1963 | Schilberg ............. 280/792 |
| 4,489,586 | A | * | 12/1984 | Hess ................ 72/389.3 |
| 5,911,844 | A | * | 6/1999 | Benedyk ............. 148/688 |

* cited by examiner

*Primary Examiner*—David P Bryant
*Assistant Examiner*—Sarang Afzali

(57) ABSTRACT

A variable thickness member for a vehicle includes a first portion having a first thickness and a second portion extending from the first portion having a second thickness. The first thickness is different from the second thickness and the first thickness and the second thickness are integral, unitary, and one piece.

3 Claims, 4 Drawing Sheets

METHOD OF MAKING A VARIABLE THICKNESS MEMBER FOR A VEHICLE

TECHNICAL FIELD

The present invention relates generally to vehicles and, more specifically, to a variable thickness member for a vehicle.

BACKGROUND OF THE INVENTION

It is known to construct frames for vehicles such as automotive vehicles with longitudinal rails. The longitudinal rails of the vehicle must provide adequate load carrying capacity in order to minimize dash and toe-pan intrusion in the event of a frontal impact. As such, the longitudinal rails are typically made of steel.

It is desirable to reduce mass of a structure in vehicle body and chassis applications such as rails for a vehicle. However, longitudinal rails must have a desired stiffness and reducing the mass of these rails results in reduced stiffness of the rails.

It has been suggested to use a light-weight material such as aluminum to reduce the mass of the structure such as a rail. Boxed aluminum beams have the opportunity to reduce weight by as much as 30% over boxed steel beams if additional section height is available. However, if the exterior section size of the rail is constrained, aluminum offers no mass savings advantage over steel because three times the volume of steel is needed to obtain the required bending stiffness.

It has also been suggested to use different gage thicknesses where needed to achieve a light-weight design. Currently, there are two kinds of commercial tailor sheet metal blanks used to achieve the light-weight designed vehicle structures. One is "Tailor Welded Blank (TWB)", which requires welding two or more different gage blanks together. The other one is "Tailor Rolled Blank (TRB)", which uses rollers to compress the coil blank in a controllable manner to achieve variable thickness in the longitudinal direction. These two tailor blanks can be purchased as pre-form blanks with some cost premium over the original coil blanks.

As a result, it is desirable to provide a variable thickness member or blank to achieve the desirable thickness reduction where needed for a longitudinal rail of a vehicle. It is also desirable to provide a blank that does not require welding and has no discontinuity at a weld line for a longitudinal rail of a vehicle. Therefore, there is a need in the art to provide a new cost effective variable thickness member for a vehicle that meets these desires.

SUMMARY OF THE INVENTION

Accordingly, the present invention is a variable thickness member for a vehicle including a first portion having a first thickness and a second portion extending from the first portion having a second thickness. The first thickness is different from the second thickness and the first thickness and the second thickness are integral, unitary, and one piece.

In addition, the present invention is a method of making a variable thickness member for a vehicle. The method includes the steps of providing a planar blank and stretching the planar blank to form a stretched blank. The method also includes the steps of forming the stretched blank into a variable thickness member having a variable thickness along its length.

One advantage of the present invention is that a variable thickness member or "Tailor Stamped Blank (TSB)" is provided for a vehicle that is formed from a metal stretching process that does not require welding and has no thickness discontinuity at a weld line. Another advantage of the present invention is that the TSB can be made as wide as the tool allows while the commercial TRB is limited due to its allowable width for a longitudinal rail of a vehicle frame. Yet another advantage of the present invention is that the TSB is quite cost effective in designing and forming light-weight body and chassis structure components. Still another advantage of the present invention is that the TSB is less costly than conventional TWB or TRB. A further advantage of the present invention is that the TSB with variable thickness can be easily integrated into a conventional forming process as pre-forming operations.

Other features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
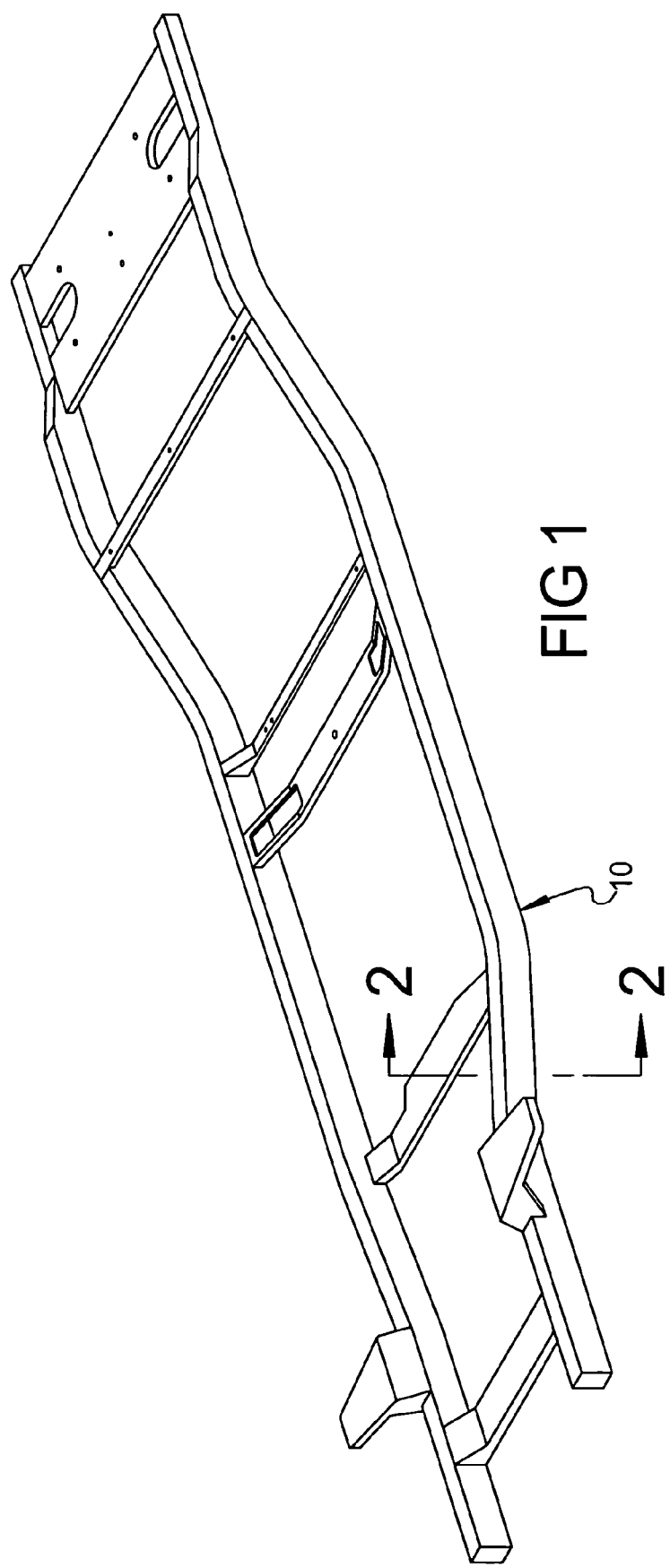
FIG. 1 is a perspective view of a rail assembly, according to the present invention.
Figure 2:
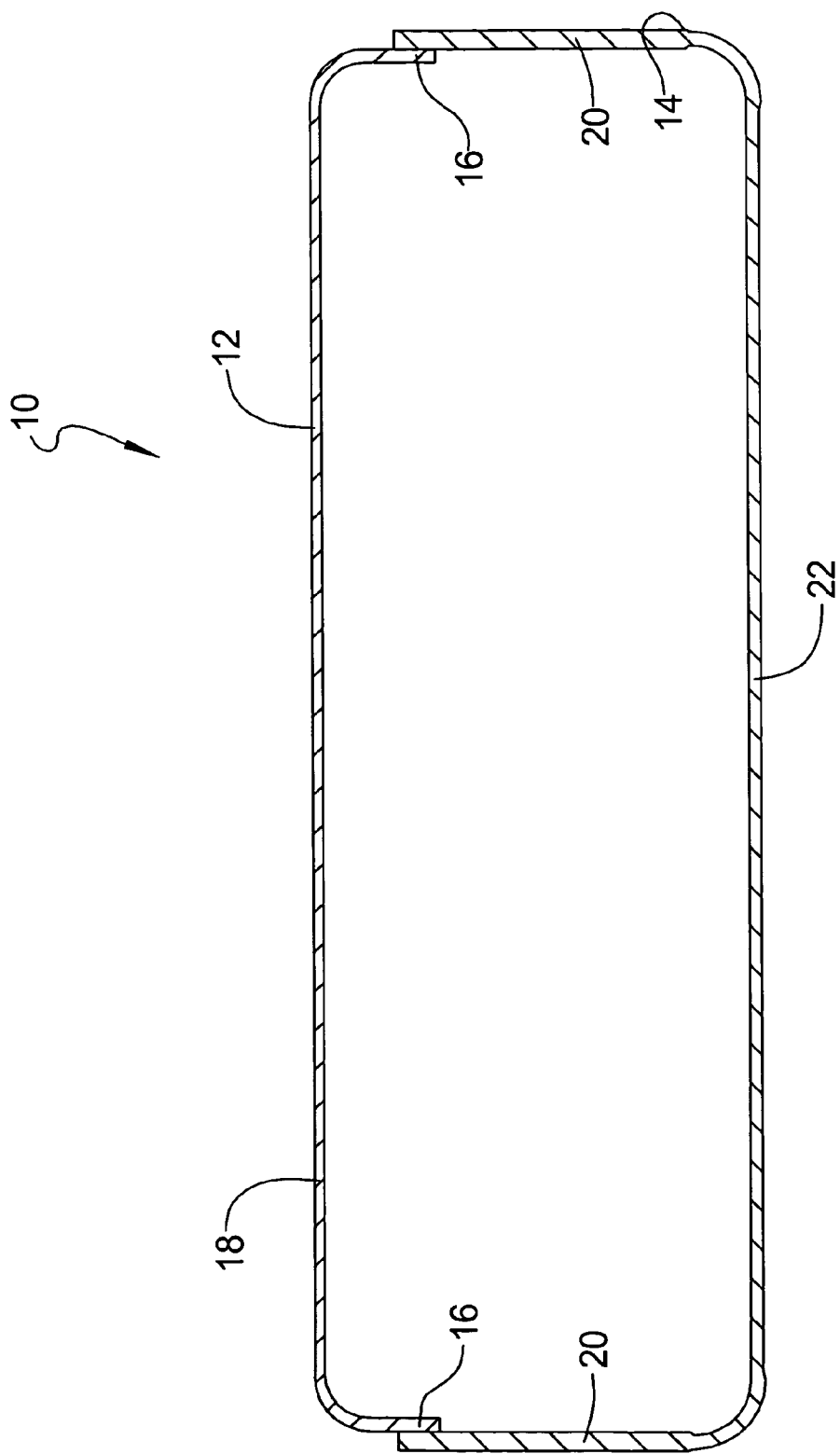
FIG. 2 is a sectional view taken along line 2-2 of FIG. 1.

Referring to the drawings and in particular FIGS. 1 and 2, one embodiment of a rail assembly 10, according to the present invention, is generally shown for a vehicle (not shown). The rail assembly 10 includes a first rail member 12 and a second rail member 14, for example, forming a closed cross-section. The first rail member 12 includes two lateral sides 16 extending longitudinally and a web 18 therebetween extending between the sides 16 and longitudinally. The sides 16 and web 18 define a generally U-shaped cross-section. The sides 16 have a thickness greater than the web 18 to form a variable thickness member. The first rail member 12 is made of a metal material with good elongation properties such as mild steel or aluminum. The first rail member 12 is formed by a method to be described. It should be appreciated that the second rail member 14 is a monolithic structure being integral, unitary, and one piece.

The second rail member 14 includes two lateral sides 20 extending longitudinally and a web 22 therebetween extending between the sides 20 and longitudinally. The sides 20 and web 22 define a generally U-shaped cross-section. The sides 20 have a thickness greater than the web 22 to form a variable thickness member. The sides 20 overlap the sides 16 to form the rail assembly 10 with a generally rectangular cross-sectional shape. The second rail member 14 is made of a metal material with good elongation properties such as mild steel or aluminum. The second rail member 14 is formed by a method to be described. It should be appreciated that the second rail member 14 is a monolithic structure being integral, unitary, and one piece. It should also be appreciated that the rail assembly 10 has less mass than a conventional rail assembly.

Referring to FIG. 2, the sides 16 of the first rail member 12 are disposed in abutting relationship with the sides 20 of the second rail member 14. The sides 16 of the first rail member 12 and the sides 20 of the second rail member 14 are fixedly secured together. More specifically, the sides 16 of the first rail member 12 are MIG welded to the sides 20 of the second rail member 14 at predetermined points along the longitudinal expanse thereof. It should be appreciated that the rail assembly 10 may be defined as a variable thickness member having a closed rectangular cross-section.

Referring to FIGS. 3 through 6, one embodiment of a method, according to the present invention, of making a variable thickness member, for example as the first rail member 12 or second rail member 14 for the rail assembly 10, is shown for assembly in automotive structures (not shown) of a vehicle (not shown). The method stretches a sheet metal blank utilizing the "uniform stretching (strain) property" inherent in the metal material to achieve a thickness reduction where desired. It should be appreciated that this may be accomplished with a "stretch forming process".

Figure 3:
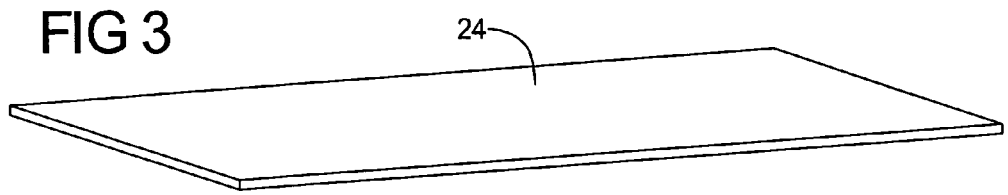
FIG. 3 is a perspective view of a blank used to form a portion of the rail assembly of FIG. 2 illustrating a first step of a method, according to the present invention, of forming a tailor stamped blank for the rail assembly.
Figure 4:
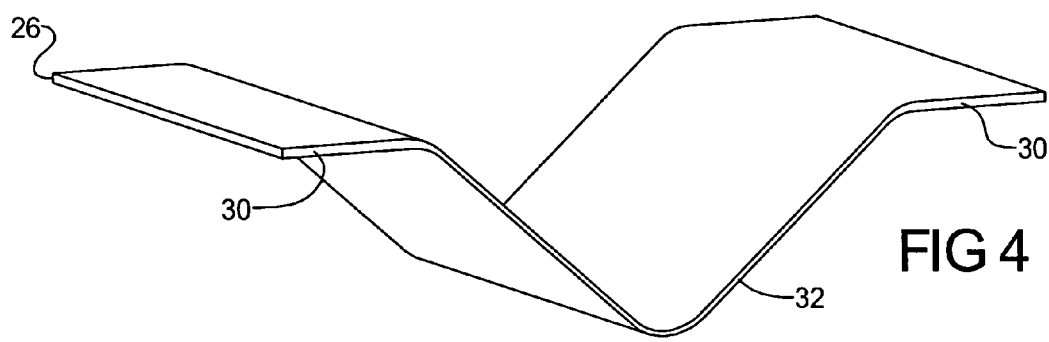
FIG. 4 is a view similar to FIG. 3 illustrating a first step of the method.

The method includes the step of forming a planar shaped member by trimming a flat or planar blank 24 from a coil (not shown) of metal material as illustrated in FIG. 3. The method also includes the step of forming a stretched member 26 as illustrated in FIG. 4. As illustrated in FIG. 4, the stretched member 26 has two lateral sides 30 extending longitudinally and a web 32 therebetween extending between the sides 30 and longitudinally. The web 32 has a generally V-shaped cross-section, but any shape, which achieves uniform thinning, can be used. The sides 30 have a thickness greater than the web 32.

Figure 6:
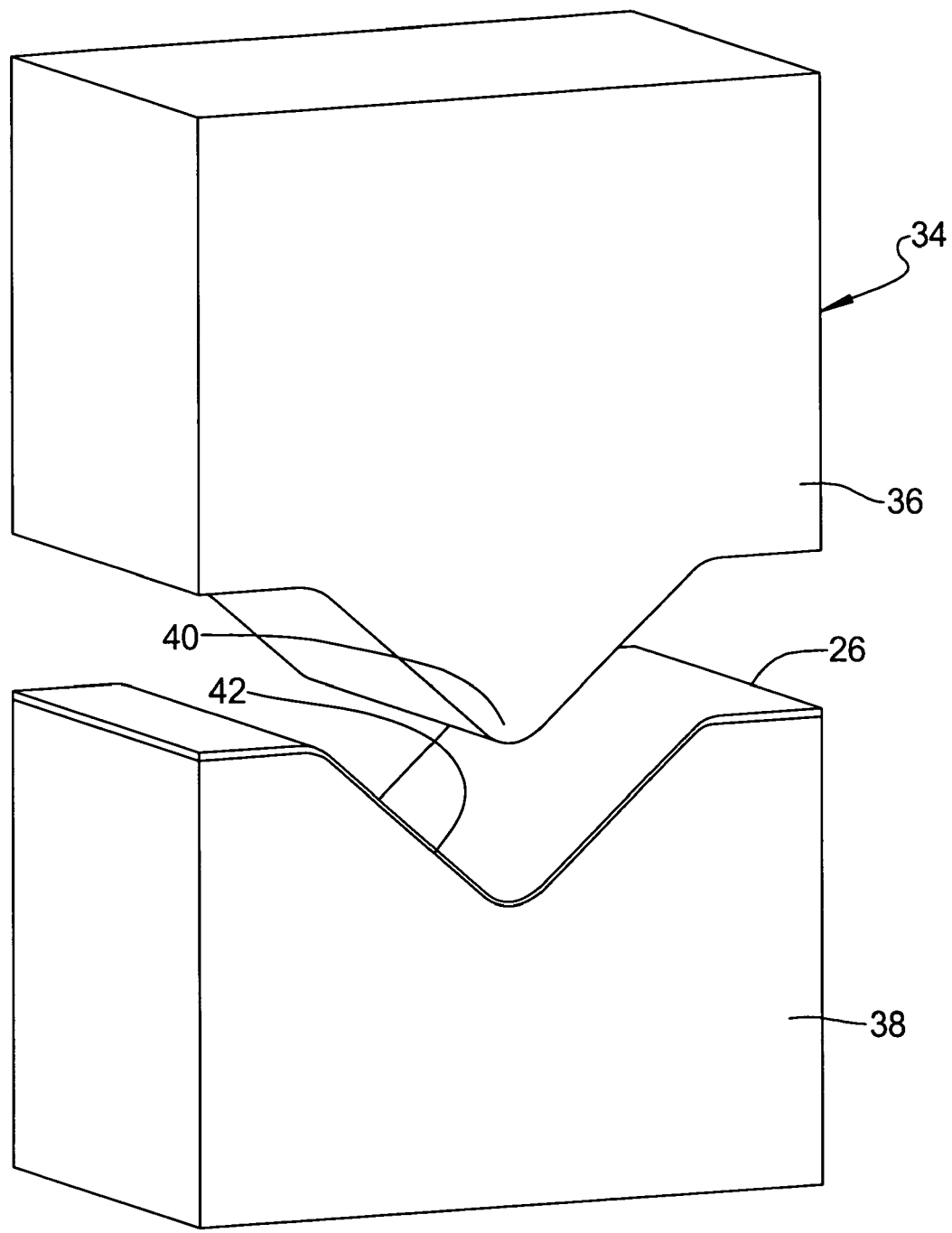
FIG. 6 is a view similar to FIG. 3 illustrating a second step of the method.

The method includes the step of forming the blank 24 into a pre-formed blank or stretched member 26 with a die form operation as illustrated in FIG. 6. The blank 24 is placed in a die set, generally indicated at 34, comprised of an upper die half 36 and a lower die half 38. The upper die half 36 includes projection portion 40 and the lower die half 38 includes a cavity portion 42 for receiving the blank 24 and the projection portion 42. The upper die half 36 and lower die half 38 are progressively closed so that the blank 24 is progressively deformed into the cavity portion 40 of the die set 34 to stretch the web 32. It should be appreciated that a pre-formed blank with a variable thickness can be obtained with a wedge-shaped punch stretching.

Figure 5:
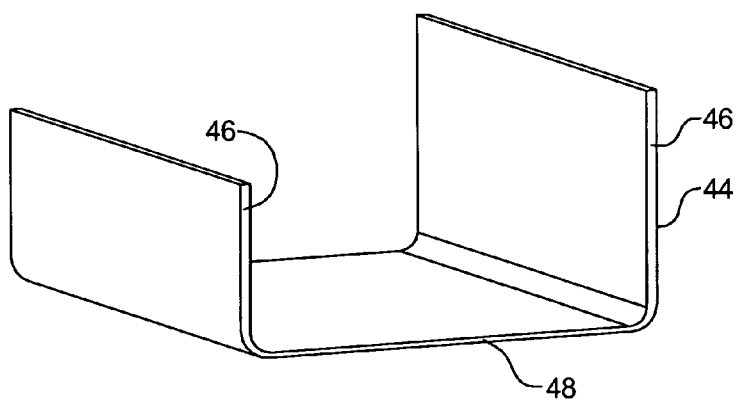
FIG. 5 is a view similar to FIG. 3 illustrating the blank after performing the second step of the method.

The method includes the step of forming the stretched member 26 into a channel shaped member 44 as illustrated in FIG. 5. The stretched member 26 is placed in a channel-forming die to be bent to form the channel-shaped member 44. As illustrated in FIG. 5, the channel-shaped member 44 has two lateral sides 46 extending longitudinally and a web 48 therebetween extending between the sides 46 and longitudinally. The sides 44 and web 46 define a generally U-shaped cross-section. The sides 46 have a thickness greater than the web 48. It should be appreciated that the channel shaped member 44 may have either a "C" or "U" shaped cross-section. It should also be appreciated that, after punch-stretching, the pre-formed blanks can be flattened and trimmed into flat blanks with variable thickness or continued to be formed directly. It should further be appreciated that these flat blanks can be stamped into a rail-type structure with variable thickness along its length, which may be desirable for a motor compartment rail application.

The method further includes the step of welding a pair of channel shaped members 44 together to form a closed section assembly such as the rail assembly 10. The welding occurs along an interface between the sides 46 of the channel-shaped members 44.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention of claimed is:

1. A method of making a variable thickness member for a vehicle, said method comprising the steps of:
   providing a planar blank;
   providing a die set having a first die half with a projection portion and a second die half with a cavity portion to receive the projection portion;
   stretching the planar blank to form a stretched blank, wherein stretching the planar blank includes stamping the planar blank with a punch stretching operation; and
   forming the stretched blank into a variable thickness member having a variable thickness along its length; and
   forming the variable thickness member into first and second channel shaped members, each of the channel shaped members having a pair of side walls extending longitudinally and a web extending between the side walls, the web having a thickness less than a thickness of the side walls;
   wherein each side wall of the first channel shaped member is attached to a respective one of the side walls of the second channel shaped member at predetermined points along the longitudinal expanse thereof to thereby form a closed section assembly.

2. A method as set forth in claim 1 including the step of placing the planar blank on the second die half.

3. A method as set forth in claim 2 including the step of closing the first die half on the second die half so that the blank is deformed into the cavity portion to stretch the blank.

\* \* \* \* \*